(12) United States Patent  (10) Patent No.: US 9,358,621 B2
Sagstrom et al.  (45) Date of Patent: Jun. 7, 2016

(54) CUTTING INSERT AND A MILLING TOOL

(71) Applicant: SANDVIK INTELLECTUAL PROPERTY AB, Sandviken (SE)

(72) Inventors: Thomas Sagstrom, Sandviken (SE); Soren Sjoberg, Valbo (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 217 days.

(21) Appl. No.: 14/322,194

(22) Filed: Jul. 2, 2014

(65) Prior Publication Data
US 2015/0016901 A1  Jan. 15, 2015

(30) Foreign Application Priority Data

Jul. 3, 2013 (SE) .................................... 1350827

(51) Int. Cl.
*B23F 21/16* (2006.01)
*B23C 3/28* (2006.01)
*B23C 5/20* (2006.01)
*B23F 17/00* (2006.01)
*B23C 5/00* (2006.01)

(52) U.S. Cl.
CPC ... *B23C 3/28* (2013.01); *B23C 5/20* (2013.01); *B23C 5/207* (2013.01); *B23F 17/005* (2013.01); *B23C 2200/0416* (2013.01); *B23C 2200/243* (2013.01); *Y10T 407/1942* (2015.01); *Y10T 407/24* (2015.01); *Y10T 407/245* (2015.01)

(58) Field of Classification Search
CPC ............... B23B 2200/0404; B23B 2200/0414; B23B 27/1633; B23B 27/1625; B23B 27/164; B23F 21/163; B23F 21/166
See application file for complete search history.

(56) References Cited

U.S. PATENT DOCUMENTS

| 1,629,667 | A | * | 5/1927 | Knipple | B23B 27/06 407/103 |
| 9,283,631 | B2 | * | 3/2016 | Sjoo | B23F 21/166 |
| 2003/0005803 | A1 | * | 1/2003 | Satran | B23C 3/08 83/663 |
| 2003/0165363 | A1 | | 9/2003 | Wermeister | |
| 2007/0245866 | A1 | * | 10/2007 | Wickman | B23B 27/065 82/1.11 |
| 2008/0206007 | A1 | | 8/2008 | Hughes | |
| 2012/0207553 | A1 | * | 8/2012 | Sjoo | B23F 21/166 407/25 |

FOREIGN PATENT DOCUMENTS

| DE | 929-588 | | 6/1955 |
| EP | 1356885 | A2 | 10/2003 |
| WO | 9218280 | | 10/1992 |

* cited by examiner

*Primary Examiner* — Will Fridie, Jr.
(74) *Attorney, Agent, or Firm* — Corinne R. Gorski

(57) ABSTRACT

A milling tool for the milling of a slot in a workpiece includes a plurality of cutting inserts, which comprise an underside; an opposite upper side, which forms a chip surface and extends parallel to an extension plane; and an edge side between the upper side and the underside. A cutting edge, which extends between the edge side and the chip surface, includes a primary main cutting edge; a front cutting edge, which extends along an edge line; and a primary corner cutting edge, which extends between and connects the primary main cutting edge and the front cutting edge. The primary corner cutting edge has a convex shape and extends, with respect to a rear portion of the cutting insert, forward from the front cutting edge to a position on the other side of an imaginary line, which forms an extension of the edge line and extends in a tangential direction to a point on the primary corner cutting edge.

22 Claims, 15 Drawing Sheets

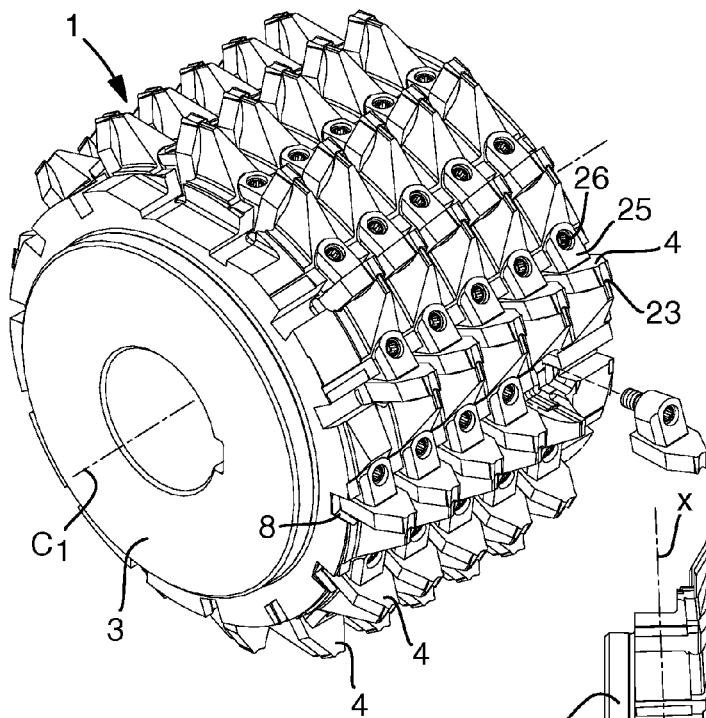
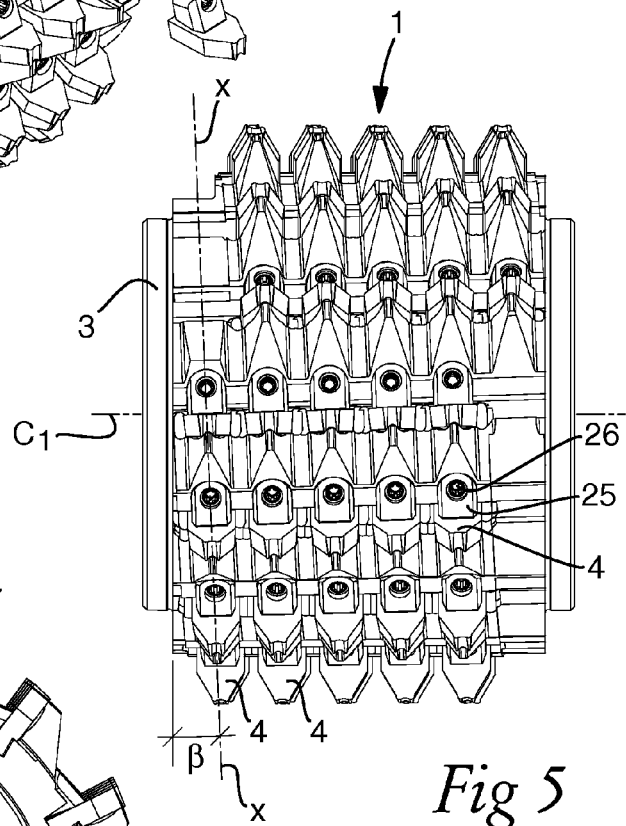
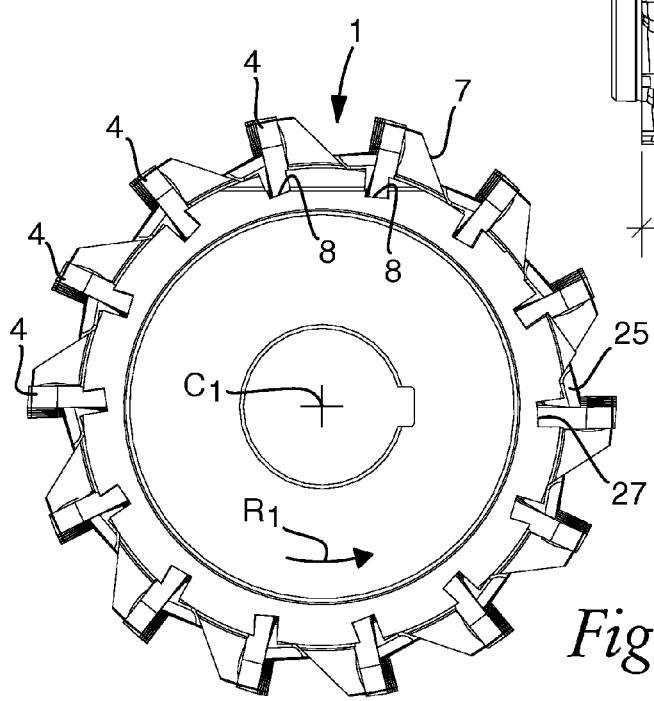
Fig 4
Fig 5
Fig 6

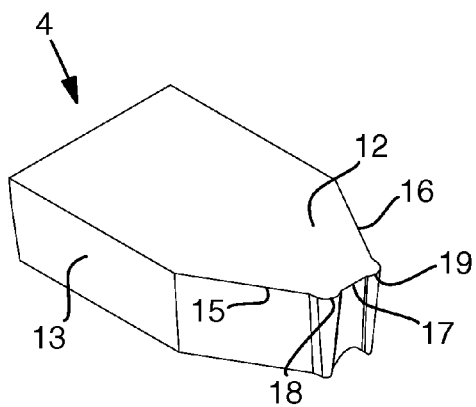
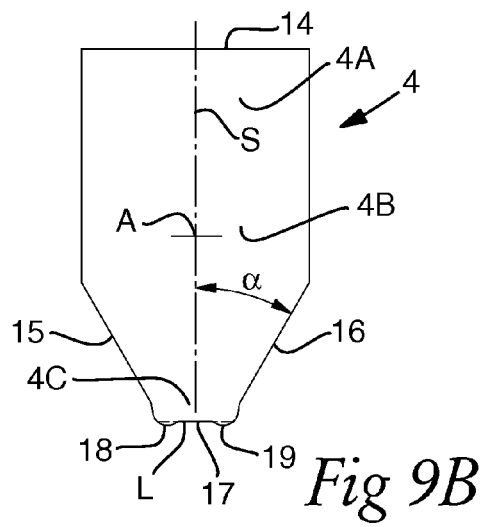
*Fig 9A*  *Fig 9B*
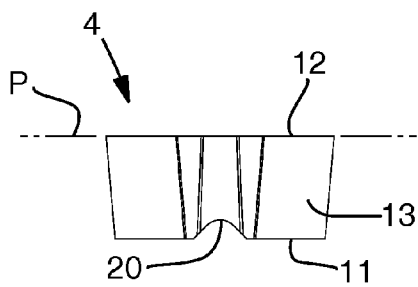
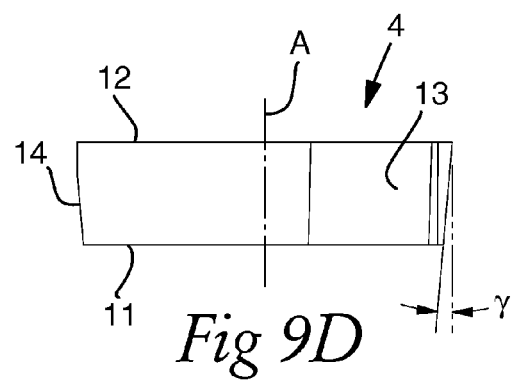
*Fig 9C*  *Fig 9D*
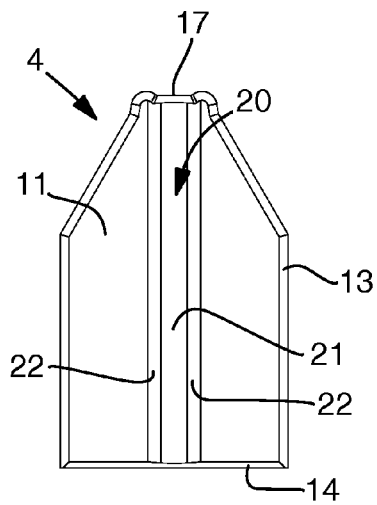
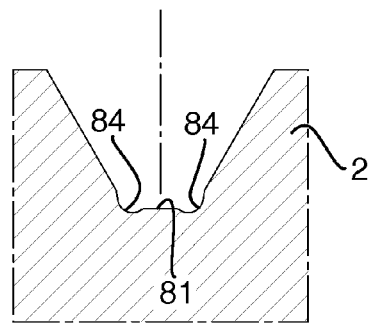
*Fig 9E*  *Fig 9F*

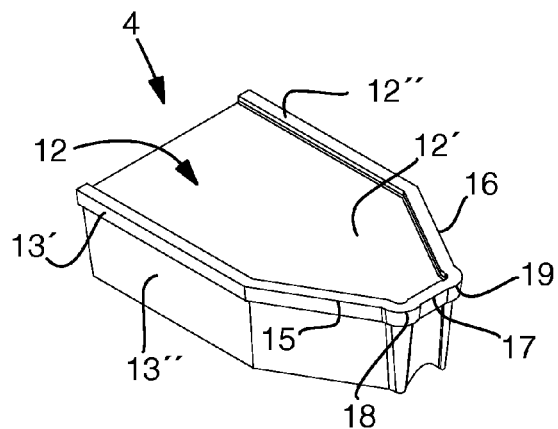
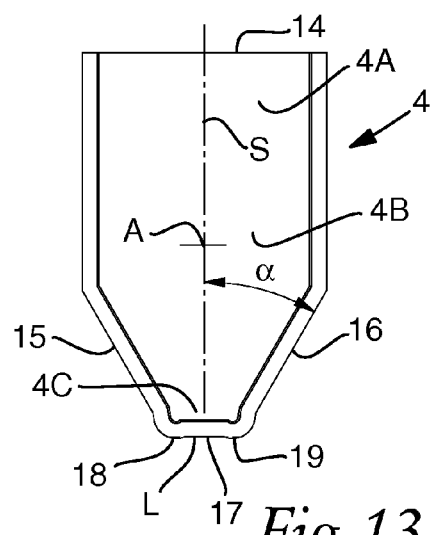
*Fig 13A*  *Fig 13B*
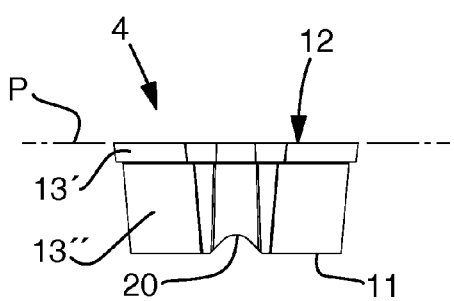
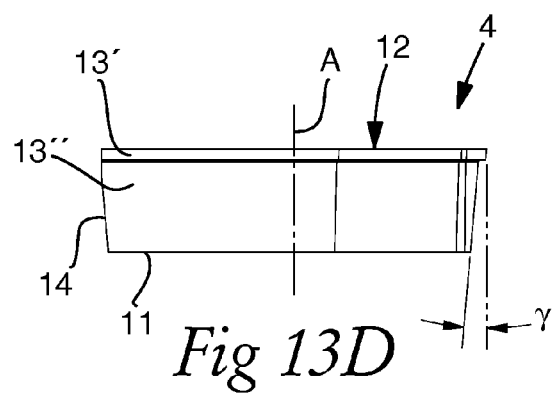
*Fig 13C*  *Fig 13D*
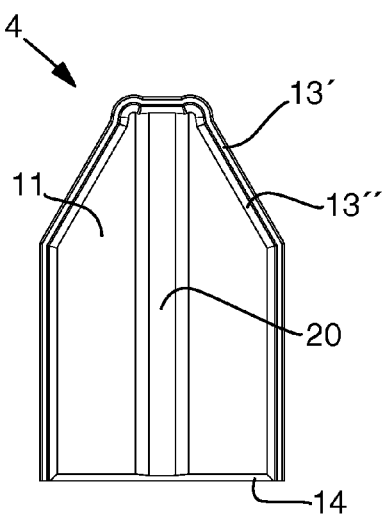
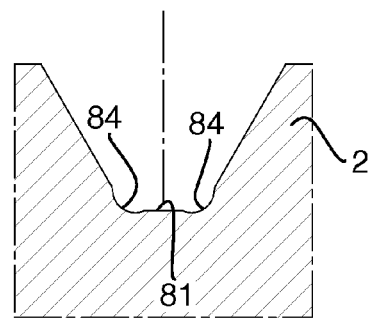
*Fig 13E*  *Fig 13F*

CUTTING INSERT AND A MILLING TOOL

RELATED APPLICATION DATA

This application claims priority under 35 U.S.C. §119 to SE Patent Application No. 1350827-0, filed on Jul. 3, 2013, which the entirety thereof is incorporated herein by reference.

TECHNICAL FIELD

The present invention concerns a cutting insert for a milling tool formed for the milling of slots in a workpiece. The cutting insert is formed for the milling of internal or external tooth slots of spline joints, so-called splines, for instance spline joints according to ISO14.

BACKGROUND

In the cutting machining of slots of gearwheels, with working teeth, or spline joints, with non-working teeth, it is, using today's technique, generally difficult to provide a final shape of the so-called root of the tooth slots 82 between adjacent teeth 83, i.e., the bottom surface 81 of the tooth slots 82 and the area at the bottom of the tooth slots 82, see FIG. 18, particularly of the shaft 80 of the spline joint. This difficulty may also be present in the hub 90 of the spline joint. Today, the machining of such slots is carried out in several steps where the shape of the root, or final shape is achieved by subsequent machining steps, including milling using another milling insert and grinding in another machine and in another set-up, which thereby imposes requirements of a preceding measurement of the workpiece before the final machining.

Spline joints formed according to ISO14 may have a so-called bottom guide, which means that centering of the spline joint is effected by means of bottom surfaces 81 of the tooth slots 82 in the shaft 80. These bottom surfaces 81 also form the abutment surfaces of the shaft 80 against the hub 90. In these spline joints, there is simultaneously a gap between the outer peripheral surface 91 of the teeth 83 of the shaft 80 and the tooth slots 92 of the hub 90.

It will be appreciated that the important abutment surfaces of the shaft 80 and the hub 90 have to have high tolerances, which most often are obtained by the surfaces being ground. In order for the bottom surfaces 81 of the shaft 80, which form abutment surfaces, to be possible to be ground, it is required that the shaft 80 has undercuts 84 between the bottom surfaces 81 of the tooth slots 82 and the flank surfaces 85 of the respective adjacent tooth 83.

Normally, a shaft is manufactured by milling out the gaps one by one, to a radius that is greater than the final radius of the guide surfaces. This may be done by a slitting cutter, which rotates on its own center shaft and the workpiece, wherein the shaft is fed forward in its longitudinal direction. This operation may also be made by a hob tool. In such a tool, the cutting inserts are placed along a helical line of several turns, along a cylindrical tool body. At the same time as the tool rotates, the workpiece (the shaft) also rotates and either the shaft or the tool is simultaneously linearly fed in the longitudinal direction of the shaft.

In the next step, the above-mentioned undercuts 84 are created by, for instance, slit cutting, hobbing, or in some other suitable way.

In the third step, the surfaces are machined to the desired circular and cylindrical shape, wherein the guide surfaces, in this case the bottom or abutment surfaces of the shaft between the teeth, obtain the final radius.

EP-B-580591 discloses a milling tool formed for cutting rough machining by the milling of slots of gearwheels. The milling tool includes a plurality of segments, each one of which has a plurality of cutting blades arranged one after the other. The segments are different and formed for rough machining, semi-fine machining and final machining. EP-B-580591 discloses cutting blades for rough machining. Each such cutting blade comprises an under side, an opposite upper side forming a chip surface, and an edge side between the upper side and the underside. A shaft extends through the underside and the upper side. A cutting edge extends between the edge side and the chip surface and is partly formed to be in engagement with the workpiece. The cutting edge comprises a relatively short primary side cutting edge, a relatively short secondary side cutting edge, as well as a relatively long front cutting edge, which borders on and connects the primary side cutting edge and the secondary side cutting edge. The front cutting edge may have a different design with a curvature. These designs of the front cutting edge have the function of influencing the chip removal and the strength of the cutting blade.

US 2008/0206007 discloses another milling tool for cutting rough machining by the milling of slots in a turbine disk. Each slot is, after a subsequent final machining, formed to receive and hold a turbine blade in the turbine disk. The milling tool comprises a plurality of cutting inserts having a cutting edge, which comprises a primary side cutting edge, a secondary side cutting edge, and a front cutting edge, which connects the primary side cutting edge and the secondary side cutting edge.

DE-929 588 discloses a milling tool for the milling of teeth. The milling tool comprises a plurality of cutting inserts, each one of which has a front cutting edge and a co-lateral cutting edge. The front cutting edge borders directly on the co-lateral cutting edge.

EP 1356885 discloses another type of cutting insert formed to be mounted in a milling tool for the milling of camshafts. The cutting insert comprises an under side, an opposite upper side, and an edge side, which forms a chip surface. The principal clamping direction for the attachment of the cutting insert extends radially in the milling tool.

US 2003/0165363 discloses an additional example of a type of cutting insert formed to be mounted in a milling tool for the milling of camshafts.

US 2003/0005803 discloses another example of a cutting insert formed to be mounted in a milling tool for the milling of camshafts.

SUMMARY

An aspect of the present invention is to allow a more efficient manufacture of spline joints. More precisely, to provide a cutting insert and a milling tool, which allow a more efficient manufacture of spline joints.

This aspect is achieved by the cutting insert having a cutting edge that includes a primary corner cutting edge, which is formed to be in engagement with the workpiece during the milling and extends between and connects the primary main cutting edge and the front cutting edge. The primary corner cutting edge has a convex shape, and, with respect to the rear portion, extends forward from the front cutting edge to a position that is on the other side of an imaginary line, which forms a primary extension of the edge line and which extends further in a tangential direction from the end of the front cutting edge to a primary point on the primary corner cutting edge.

By means of such a primary corner cutting edge, it is possible to reduce the number of working operations in the milling of slots of the workpiece, for instance a tooth slot of a spline joint in the form of a shaft or a hub. According to the invention, in one and the same working operation, i.e., without replacement of tool, the slot, the bottom surface of the slot, and an undercut between the bottom surface and one side surface of the slot, i.e., the flank surface of a tooth, can be provided. Thus, by the cutting insert according to the invention, at least the two initial working steps discussed above can be replaced by a single working step. The subsequent finishing of the surfaces and particularly the bottom surface can then be carried out directly after the slots having been milled. Thereby, the invention allows an essential improvement in the efficiency in the production of spline joints. Advantageously, the primary main cutting edge may be longer than the front cutting edge.

According to one embodiment, the primary corner cutting edge has a radius that is constant from the front cutting edge to at least the primary point. Such a constant radius guarantees an even surface of the undercut and a uniform chip flow.

According to a further embodiment, the primary corner cutting edge extends, in respect to the longitudinal axis and a central portion of the cutting insert, outwardly from the primary main cutting edge to a position that is on the other side of an imaginary line, which forms an extension of the primary main cutting edge and which extends further in a tangential direction from the end of the primary main cutting edge to a point on the primary corner cutting edge. In such a manner, the undercut can get an extension also into the tooth that borders on the bottom surface.

According to a further embodiment, the primary corner cutting edge is connected with the primary main cutting edge by means of a primary transition zone, which forms a curved transition between the primary corner cutting edge and the primary main cutting edge. In such a manner, a smooth transition between the primary main cutting edge and the primary corner cutting edge is achieved, which contributes to a long service life of the cutting insert.

According to a further embodiment, the primary corner cutting edge is connected with the front cutting edge by means of a primary border zone, which forms a curved transition between the primary corner cutting edge and the front cutting edge. In such a manner, a smooth transition between the primary corner cutting edge and the front cutting edge is achieved, which contributes to a long service life of the cutting insert.

According to another embodiment, the cutting edge includes a secondary main cutting edge, which is formed to be in engagement with the workpiece during milling, and a secondary corner cutting edge, which is formed to be in engagement with the workpiece during milling and extends between and connects the secondary main cutting edge and the front cutting edge. The secondary corner cutting edge has a convex shape and, with respect to the rear portion, extends forward from the front cutting edge to a position that is on the other side of an imaginary line, which forms an extension of the edge line and which extends further in a tangential direction from the end of the front cutting edge to a point on the secondary corner cutting edge. By means of such a cutting insert, it is possible, in the same working operation, i.e., without replacement of tool, to provide the slot of a shaft or a hub of a spline joint, the bottom surface of the slot, and an undercut between the bottom surface and both of the two adjacent teeth.

According to a further embodiment, the secondary corner cutting edge is connected with the secondary main cutting edge by means of a secondary transition zone, which forms a curved transition between the secondary corner cutting edge and the secondary main cutting edge. In such a manner, a smooth transition between the secondary main cutting edge and the secondary corner cutting edge is achieved, which contributes to a long service life of the cutting insert.

According to a further embodiment, the secondary corner cutting edge is connected with the front cutting edge by means of a secondary border zone, which forms a smooth transition between the secondary corner cutting edge and the front cutting edge. In such a manner, a smooth transition between the secondary corner cutting edge and the front cutting edge is achieved, which contributes to a long service life of the cutting insert.

According to a further embodiment, the secondary corner cutting edge extends, with respect to the longitudinal axis and a central portion of the cutting insert, outwardly from the secondary main cutting edge to a position that is on the other side of an imaginary line, which forms an extension of the secondary main cutting edge and which extends further in a tangential direction from the end of the secondary main cutting edge to a point on the secondary corner cutting edge.

According to a further embodiment, the primary main cutting edge and the secondary main cutting edge converge toward each other up to the primary corner cutting edge and the secondary corner cutting edge, respectively.

According to a further embodiment, the longitudinal axis forms an angle of convergence with each one of the primary main cutting edge and the secondary main cutting edge, the angle of convergence lying in the interval 15-45°. For example, the angle of convergence may lie in the interval 15-45°, which is advantageous particularly for a use of the cutting insert in a hob tool.

According to a further embodiment, the primary main cutting edge and the secondary main cutting edge are symmetrical with respect to the longitudinal axis.

According to a further embodiment, each one of the primary main cutting edge and the secondary main cutting edge is longer than the front cutting edge.

According to a further embodiment, the front cutting edge is concave. In such a manner, a convex bottom surface, which is surrounded by two undercuts, can be provided in the slot between two adjacent teeth.

According to a further embodiment, the front cutting edge is convex. In such a manner, a concave bottom surface, which is surrounded by two undercuts, can be provided in the slot between two adjacent teeth.

According to a further embodiment, the front cutting edge is straight. In such a manner, a straight bottom surface, which is surrounded by two undercuts, can be provided in the slot between two adjacent teeth.

According to a further embodiment, the edge side has a thickness parallel to the through shaft, the upper side having an extension perpendicular to the longitudinal axis and the through shaft, the extension being longer than the thickness. Such a geometrical shape allows a so-called radial mounting of the cutting insert.

According to a further embodiment, the cutting insert includes a longitudinal groove in the underside, which extends parallel to the longitudinal axis. Such a groove can interact with a ridge of a support surface of a seat of the milling tool to guarantee an exact positioning and stable attachment of the cutting insert to the milling tool.

The aspect is also achieved by a milling tool formed for the milling of a slot in a workpiece, the milling tool being formed to rotate on a rotation axis, and having a tool body and a plurality of cutting inserts according to the above, which are mounted on the tool body.

According to a further embodiment, the longitudinal axis of each cutting insert intersects the rotation axis.

According to a further embodiment, the tool body includes a seat for each cutting insert, the seat having a support surface, which extends along a support plane parallel to the rotation axis.

According to a further embodiment, the support surface has a ridge, which interacts with a longitudinal groove of the underside of the cutting insert.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 4 is a perspective view of another milling tool including a plurality of cutting inserts.

FIG. 5 is a front view of the milling tool in FIG. 4.

FIG. 6 shows a view from the side of the milling tool in FIG. 4.

FIGS. 9A-8F are six different views corresponding to FIGS. 7A-7F but regarding a cutting insert according to a third embodiment of the invention.

FIGS. 13A-13F are six different views corresponding to FIGS. 7A-7F but regarding a cutting insert according to a seventh embodiment of the invention.

DETAILED DESCRIPTION OF DIFFERENT EMBODIMENTS

Figure 1:
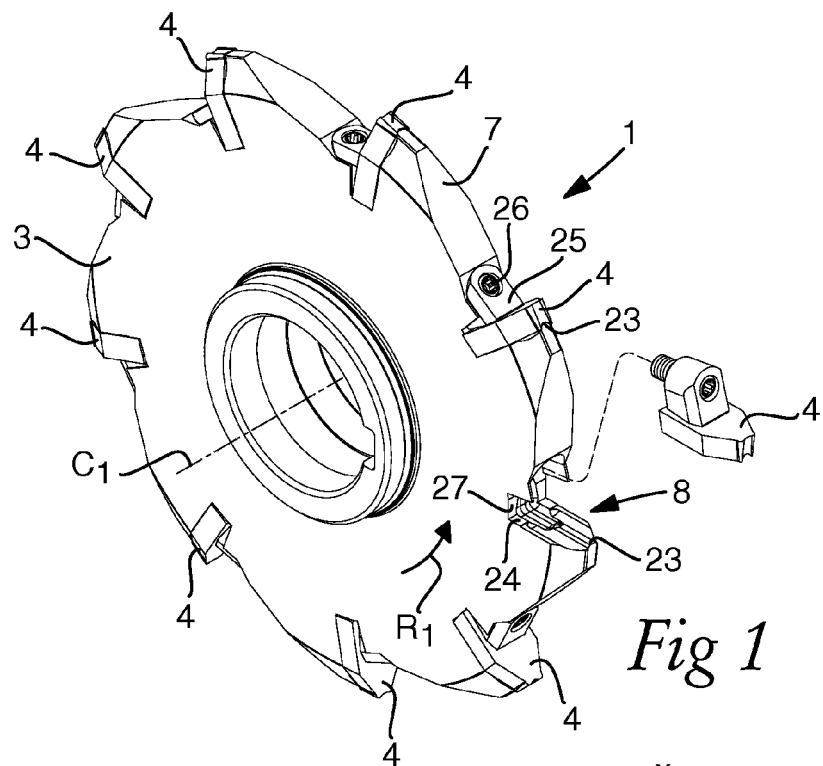
FIG. 1 is a perspective view of a milling tool having a plurality of cutting inserts.
Figure 2:
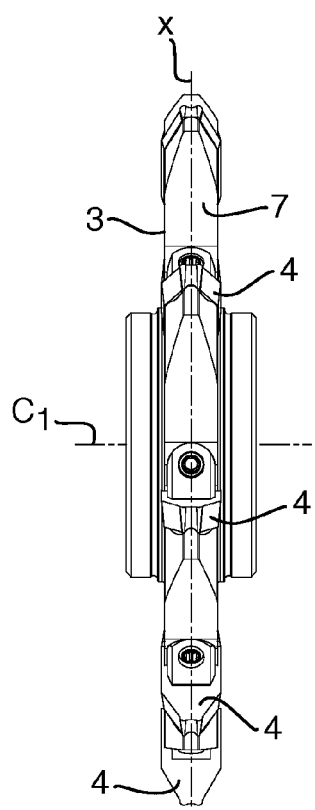
FIG. 2 is a front view of the milling tool in FIG. 1.
Figure 3:
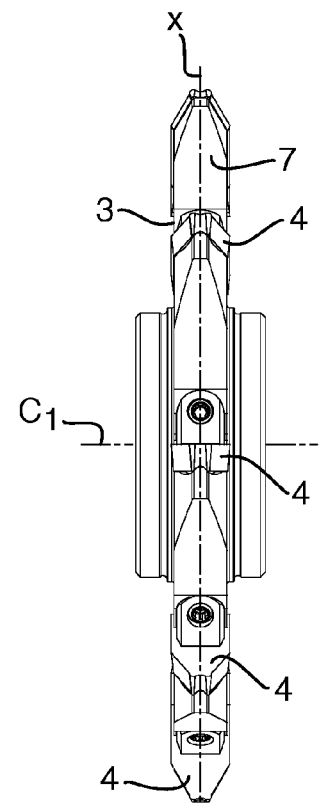
FIG. 3 shows another view from the front of the milling tool in FIG. 1.
Figure 17:
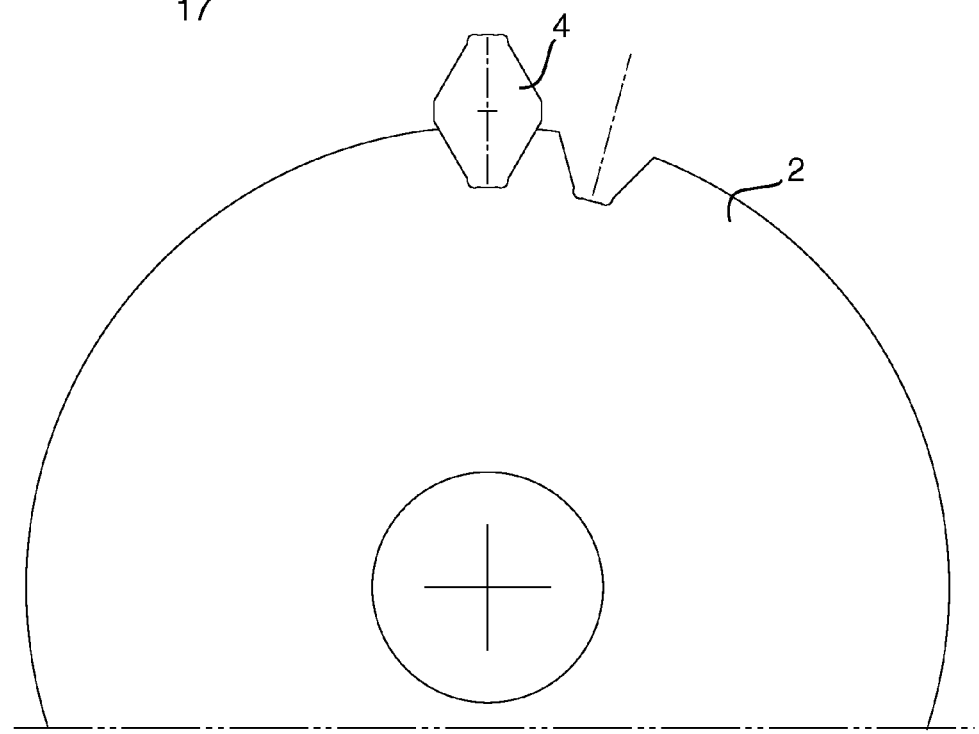
FIG. 17 is a planar view of the cutting insert in FIG. 18 in engagement with a workpiece.

FIGS. 1-3 show a milling tool 1, which is formed for the milling of slots in a workpiece 2, see FIG. 17, for instance, tooth slots of spline joints, so-called splines, and also of racks, and the like toothed elements. A spline joint has a shaft 80 and a hub 90, see FIG. 18. The shaft 80 has external tooth slots 82 and the hub 90 has internal tooth slots 92. The tooth slots 82, 92 may extend parallel to a longitudinal axis Y of the shaft 80 and the spline joint.

The workpiece 2 may be fixed in a workpiece spindle (not shown). The milling tool 1, which is shown in FIGS. 1-3, is in the form of a so-called slot cutter and includes a tool body 3, which may be manufactured from steel, and a large number of replaceable cutting inserts 4. The tool body 3 defines a rotation axis $C_1$ on which the milling tool 1 rotates in a direction of rotation $R_1$.

FIGS. 4-6 show another milling tool 1, which is formed for the milling of slots in a workpiece 2, for instance, tooth slots of spline joints, so-called splines, and also of racks, and the like toothed elements. The milling tool 1, which is shown in FIGS. 4-6, is a so-called hob tool and includes a tool body 3, which may be manufactured from steel, and a large number of replaceable cutting inserts 4. The tool body 3 defines a rotation axis $C_1$ on which the milling tool 1 rotates in a direction of rotation $R_1$.

The tool body 3 of the milling tools 1 in FIGS. 1-6 has a peripheral surface 7, which extends around the rotation axis $C_1$ and includes a large number of separated seats 8, which are arranged at the peripheral surface 7. Each seat 8 is formed to receive one of the cutting inserts 4.

The seats 8, and the cutting inserts 4, are arranged one after the other along a line x, see FIGS. 2 and 5. In the milling tool 1 shown in FIGS. 1-3, the line x is lying in a plane perpendicular to the rotation axis $C_1$. In the milling tool 1, which is shown in FIGS. 3-5 and which is in the form of a hob tool, the cutting inserts 4 are placed in the tool body 3 along the line x. In this milling tool, the line x is helically shaped and has a constant pitch with a pitch angle $\beta$ in relation to a plane perpendicular to the rotation axis $C_1$. The pitch angle $\beta$ may be 1-10°.

Different embodiments of the cutting inserts 4 will now be described in more detail, reference being made particularly to FIGS. 7A-19. It should be noted that all cutting inserts 4 of the milling tool 1 may be identical, but it is also possible to utilize different cutting inserts 4 in different positions in the milling tool 1. The cutting inserts 4 are manufactured from a harder material than the tool body 3, for instance from cemented carbide.

With reference to FIGS. 7A-7G, a first embodiment of a cutting insert 4 is shown, which includes an under side 11, an opposite upper side 12, which forms a chip surface and extends parallel to an extension plane P, and an edge side 13, which extends between the upper side 12 and the underside 11. A through axis A extends through a central portion 4B of the cutting insert 4 and through the underside 11 and the upper side 12 perpendicular to the extension plane P. A longitudinal axis S is perpendicular to and intersects the through axis A. The cutting insert 4 also has a rear portion 4A and a front portion 4C. The longitudinal axis S extends through the rear portion 4A, the central portion 4B, and the front portion 4C. According to the first embodiment, the rear portion forms a back side 14 between the upper side 12 and the underside 11. The back side 14 extends perpendicular to the longitudinal axis S, at least in the extension plane P, or on a level with the extension plane P.

The cutting insert 4 also includes a cutting edge, which extends between the edge side 13 and the chip surface, i.e., the upper side 12. The cutting edge has a primary main cutting edge 15, a secondary main cutting edge 16, a front cutting edge 17, a primary corner cutting edge 18, and a secondary corner cutting edge 19. The primary corner cutting edge 18 is situated between the primary main cutting edge 15 and the front cutting edge 17. The secondary corner cutting edge 19 is situated between the secondary main cutting edge 16 and the front cutting edge 17. The primary corner cutting edge 18, the front cutting edge 17, and the secondary corner cutting edge 19 are situated in the front portion 4C.

The cutting insert 4 has a positive cutting geometry, which means that a normal to the extension plane P forms an acute clearance angle γ with the edge side 13 along the cutting edge, i.e., along the primary main cutting edge 15, the secondary main cutting edge 16, the front cutting edge 17, the primary corner cutting edge 18, and the secondary corner cutting edge 19. The clearance angle γ may be equal along the entire cutting edge, but it may also vary and be different along the primary main cutting edge 15, the secondary main cutting edge 16, the front cutting edge 17, the primary corner cutting edge 18, and/or the secondary corner cutting edge 19. Advantageously, the longitudinal axis S of each cutting insert 4 intersects the rotation axis $C_1$ of the tool body 3 shown in FIGS. 1-3, as well as also of the tool body 3 shown in FIGS. 4-6. In other words, the extension plane P of the chip surface of each cutting insert 4 extends radially outward with respect to the rotation axis $C_1$.

Figure 7A:
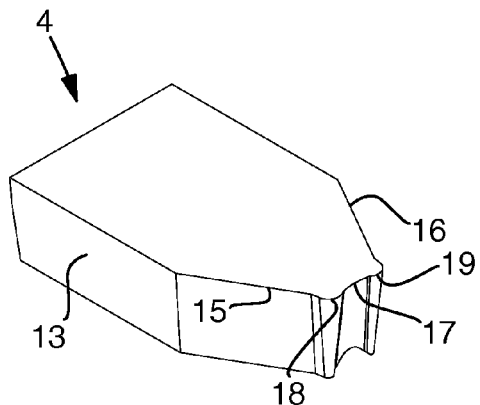
FIG. 7A is a perspective view of a cutting insert according to a first embodiment of the invention.
Figure 7B:
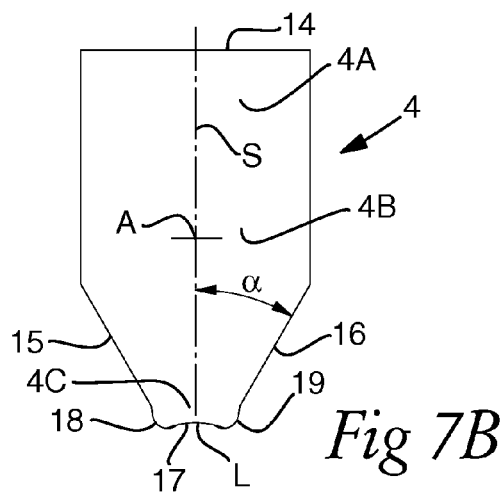
FIG. 7B is a view from above of the cutting insert in FIG. 7A.
Figure 7C:
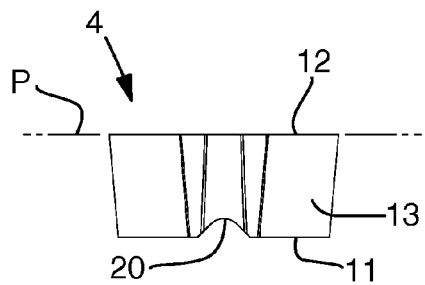
FIG. 7C shows a view from the front of the cutting insert in FIG. 7A.
Figure 7D:
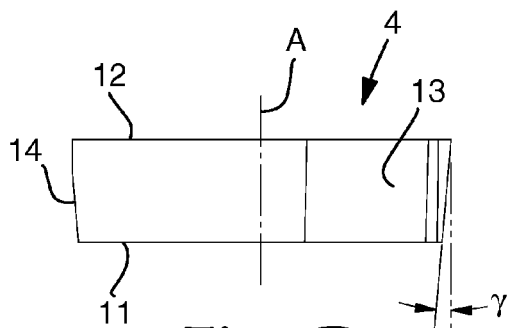
FIG. 7D shows a view from the side of the cutting insert in FIG. 7A.
Figure 7E:
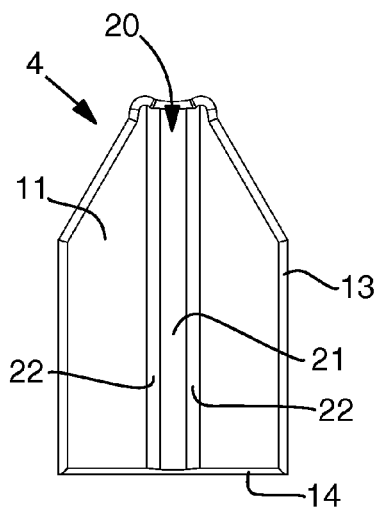
FIG. 7E shows a view from below of the cutting insert in FIG. 7A.
Figure 7F:
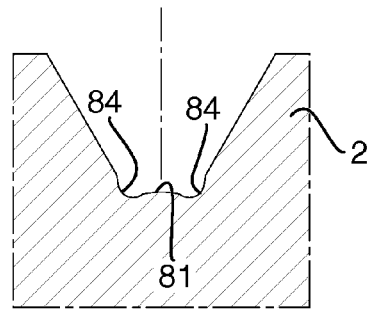
FIG. 7F is a cross-sectional view of a workpiece that has been machined by the cutting insert in FIG. 7A.

As can be seen particularly in FIGS. 7C and 7E, the underside 11 of the cutting insert 4 has a longitudinal groove 20, which extends parallel to the longitudinal axis S. The longitudinal groove 20 has a radial, or essentially radial, extension when the cutting insert 4 is mounted in the milling tool 1, i.e., with respect to the rotation axis $C_1$. The longitudinal groove 20 has a bottom surface 21 and two side surfaces 22. The side surfaces 22 connect the bottom surface 21 with the underside 11.

The bottom surface 21 and the side surfaces 22 are formed to interact with the corresponding surfaces of a ridge 23, which extends upward from a first support surface 24 of the seat 8 in the tool body 3 when the cutting insert 4 is mounted in the tool body 3, see FIGS. 1 and 4. The side surfaces 22 form an angle with each other. This angle is identical or equal to an angle of the corresponding side surfaces of the ridge 23. Thus, when the cutting insert 4 is mounted in the seat 8, the elongate groove 20 and the ridge 23 are in engagement with each other. In that connection, the side surfaces 22 are abutting against the corresponding side surfaces of the ridge 23. There may be a gap between the bottom surface 21 and the corresponding upper surface of the ridge 23.

Each cutting insert 4 according to the first embodiment is mounted in the seat 8 by means of a wedge 25, which is pressed inward, approximately radially inward by means of a fixing screw 26. When the wedge 25 is displaced inward, it will press the cutting insert 4 downward against the first support surface 24 and the ridge 23 and simultaneously inwardly against a second support surface 27 in such a way that the back side 14 abuts against the second support surface 27. When the cutting insert 4 is mounted in the seat 8, the extension plane P of the upper side 12 or chip surface of the cutting insert 4 extends radially outwardly with respect to the rotation axis $C_1$ of the milling tool 1. The edge side 13 has a thickness parallel to the through axis A. The upper side 12 has an extension perpendicular to the longitudinal axis S and the through axis A. This extension is longer than the thickness.

The primary main cutting edge 15 and the secondary main cutting edge 16 are both formed to be in engagement with the workpiece 2 during the milling. The primary and secondary main cutting edges 15 and 16 are intended to mill flank surfaces of the tooth slots that should be manufactured.

The primary main cutting edge 15 and the corner cutting edge 18, on one hand, and the secondary main cutting edge 16 and the corner cutting edge 19, on the other hand, are symmetrical in the first embodiment with respect to the longitudinal axis S, which in this embodiment forms a symmetry line. The primary main cutting edge 15 and the secondary main cutting edge 16 converge toward each other toward the front cutting edge 17. In the embodiments shown, the primary main cutting edge 15 and the secondary main cutting edge 16 converge along the entire respective main cutting edge toward the front cutting edge 17. The longitudinal axis S forms an angle of convergence a with each one of the primary main cutting edge 15 and the secondary main cutting edge 16. Particularly with respect to the cutting inserts 4 for the hob tool shown in FIGS. 4-6, the angle of convergence a lies in the interval 15-32°. However, the angle of convergence a does not need to be constant along the entire primary and secondary main cutting edges 15, 16 but may vary, see FIGS. 10B and 11B.

Furthermore, it should be noted that the angle of convergence a may assume other values than those given above and be in an interval from 15-45° depending on the application. For the milling of spline joints or splines, the angle of convergence a may lie in the interval 30-45° and, for instance, according to standard be 30, 37.5 or 45°.

It should also be noted that the primary main cutting edge 15 and the secondary main cutting edge 16 do not need to be symmetrical with respect to the longitudinal axis S. For instance, the angle of convergence a of the primary main cutting edge 15 may differ from the angle of convergence a of the secondary main cutting edge 16, preferably by a small amount. Such asymmetrical cutting inserts may, for instance, be utilized when it is desired to optimize for a dominating loading direction of a spline joint.

Each one of the primary main cutting edge 15 and the secondary main cutting edge 16 is, in the embodiments shown, longer, or considerably longer, than the front cutting edge 17. The front cutting edge 17 extends along an edge line L.

The front cutting edge 17, the primary corner cutting edge 18, and the secondary corner cutting edge 19 are also formed to be in engagement with the workpiece 2 during the milling. The front cutting edge 17, the primary corner cutting edge 18, and the secondary corner cutting edge 19 are formed to provide the final shape of the bottom surface in the gash between two adjacent tooth slots 82 of the workpiece 2, the tooth slot 82 having two undercuts 84, a first undercut 84 between the bottom surface 81 and the first flank surface 85 of the tooth slot 82, and a second undercut 84 between the bottom surface 81 and the second flank surface 85 of the tooth slot 82, see FIGS. 7F and 18.

The primary corner cutting edge 18 and the secondary corner cutting edge 19 have a convex shape.

Figure 7G:
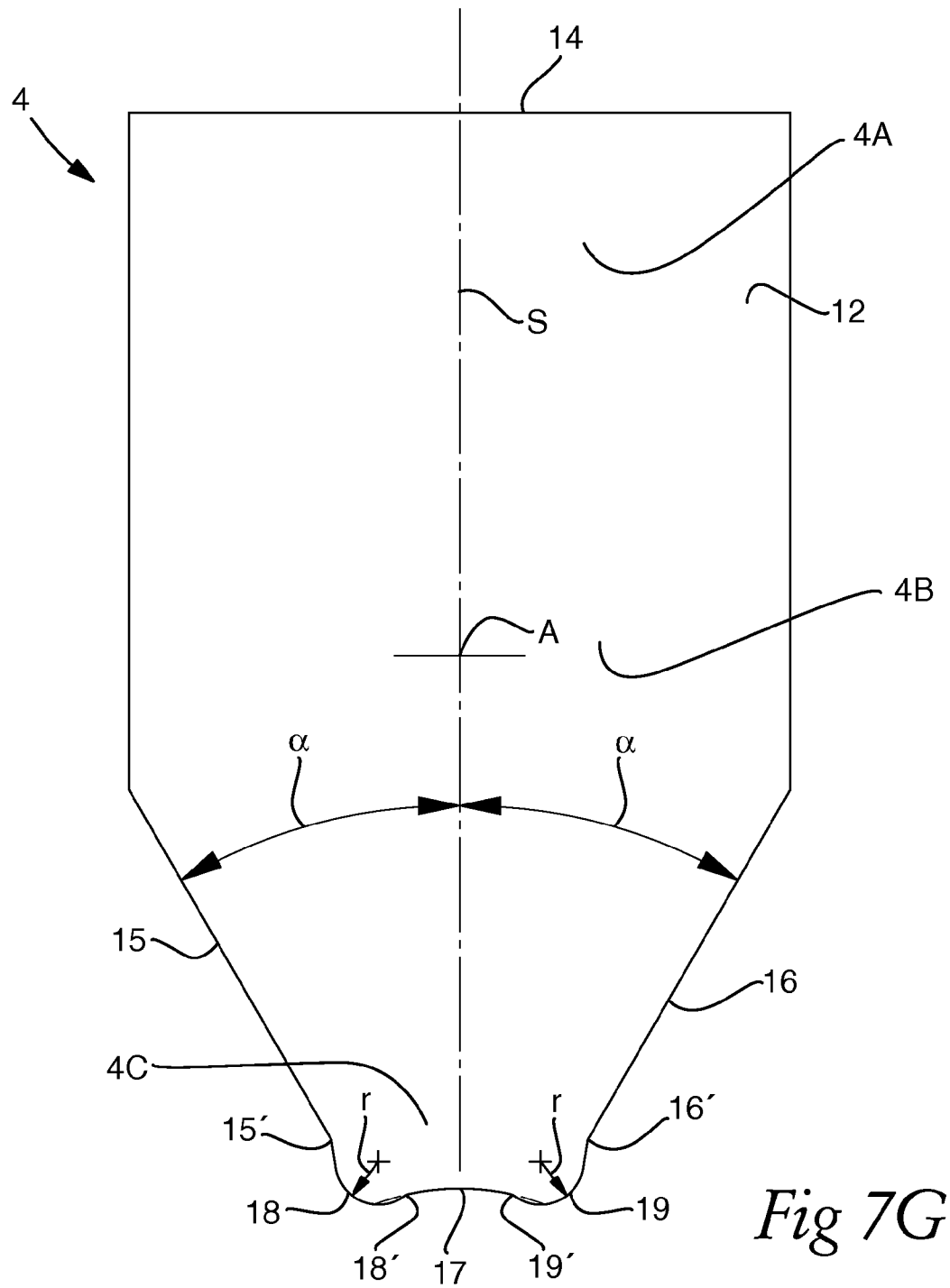
FIG. 7G is an enlarged view from above of the cutting insert in FIG. 7A.
Figure 7H:
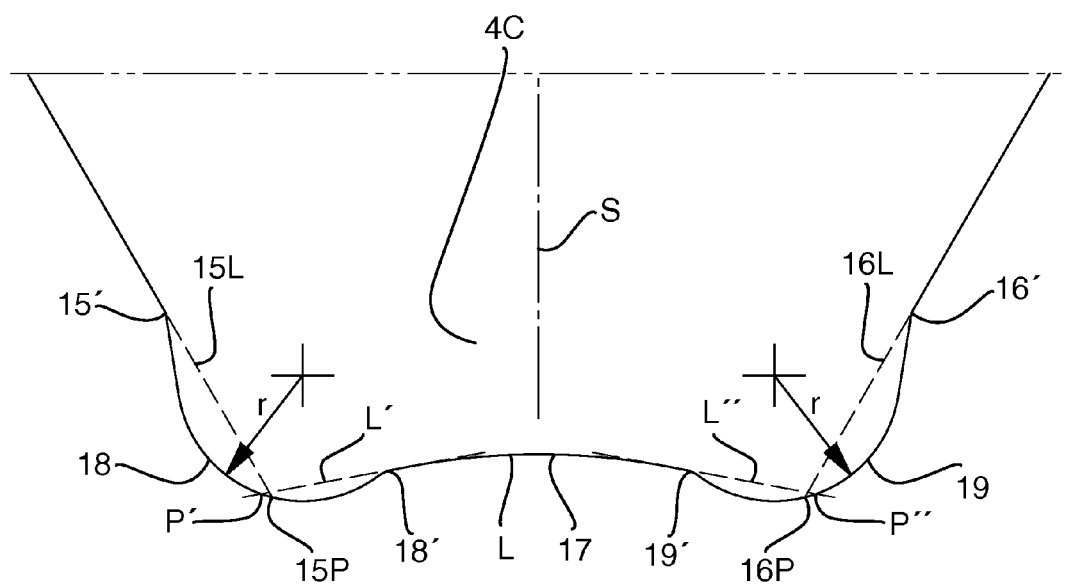
FIG. 7H is a further enlarged view from above of a front portion of the cutting insert in FIG. 7A.
Figure 8A:
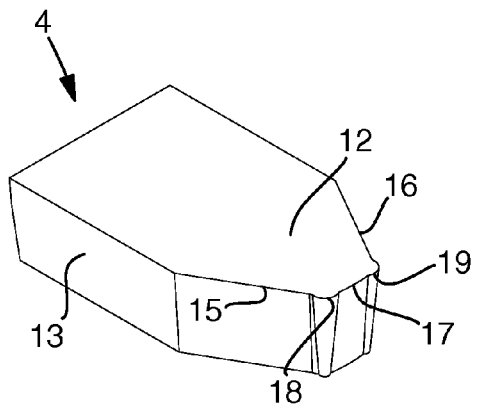
FIGS. 8A-8F are six different views corresponding to FIGS. 7A-7F regarding a cutting insert according to a second embodiment of the invention.
Figure 8B:
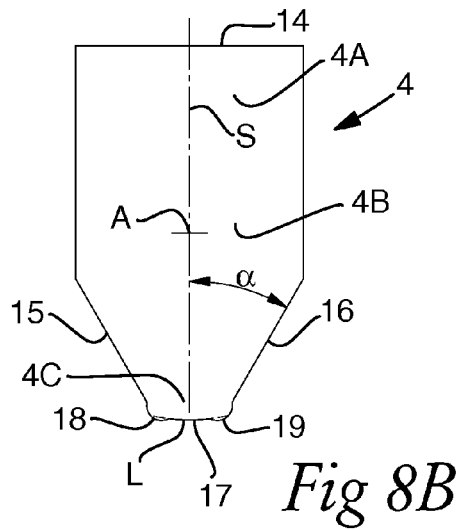
Figure 8C:
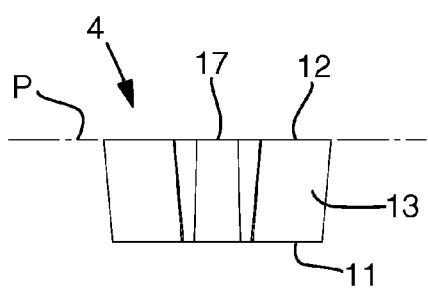
Figure 8D:
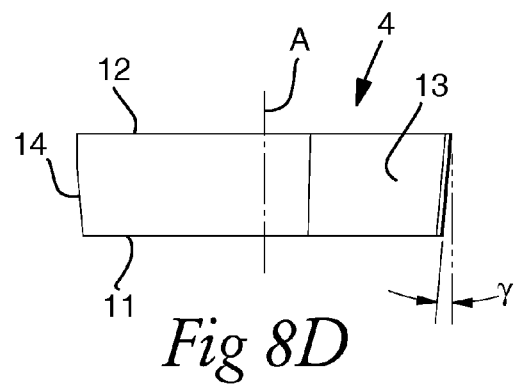
Figure 8E:
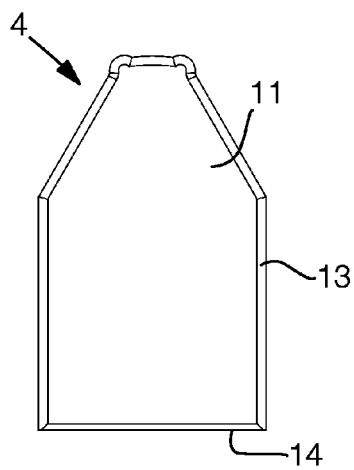
Figure 8F:
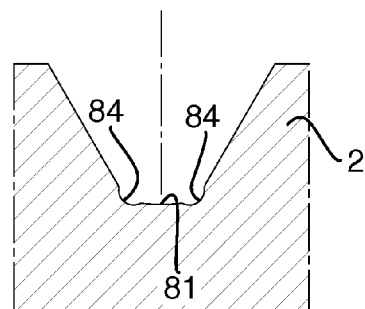
Figure 10A:
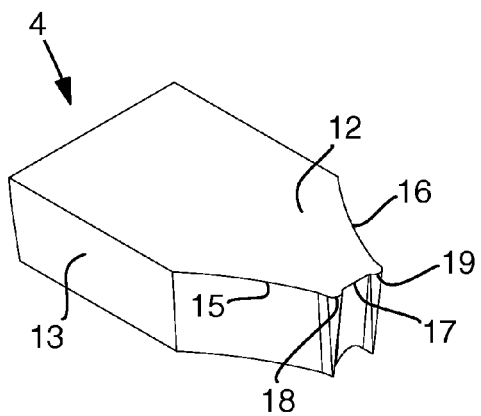
FIGS. 10A-10F are six different views corresponding to FIGS. 7A-7F but regarding a cutting insert according to a fourth embodiment of the invention.
Figure 10B:
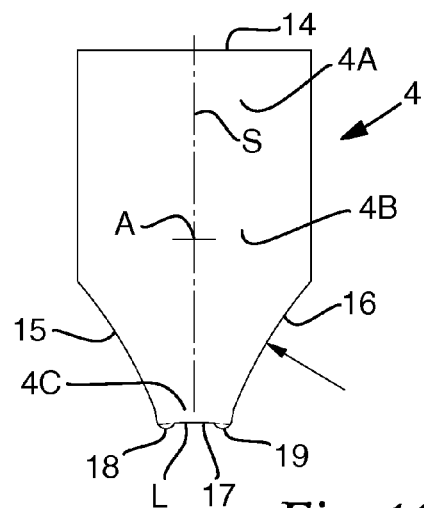
Figure 10C:
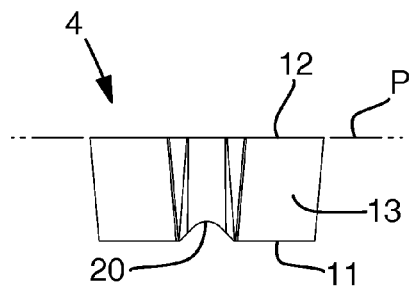
Figure 10D:
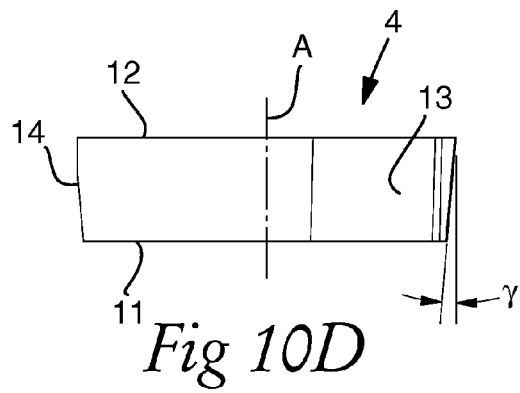
Figure 10E:
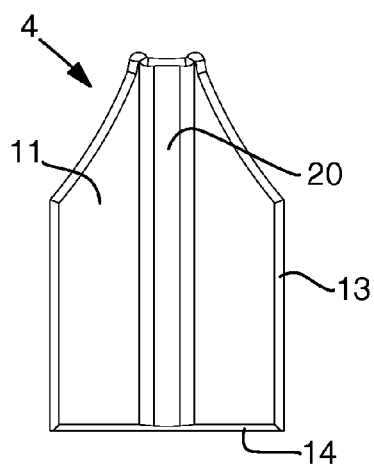
Figure 10F:
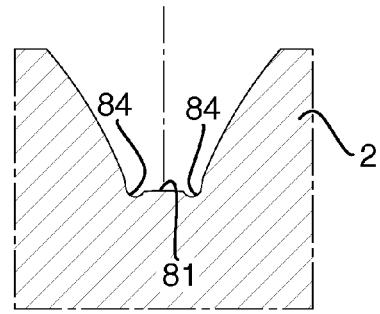
Figure 11A:
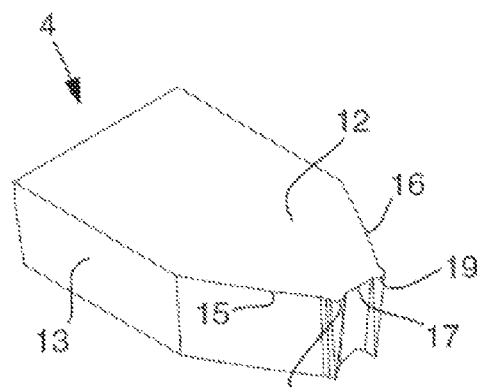
FIGS. 11A-11F are six different views corresponding to FIGS. 7A-7F but regarding a cutting insert according to a fifth embodiment of the invention.
Figure 11B:
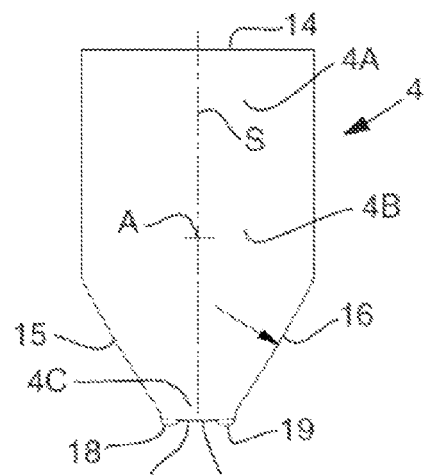
Figure 11C:
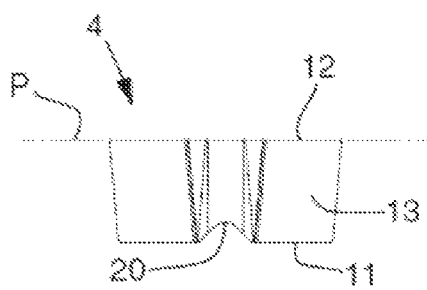
Figure 11D:
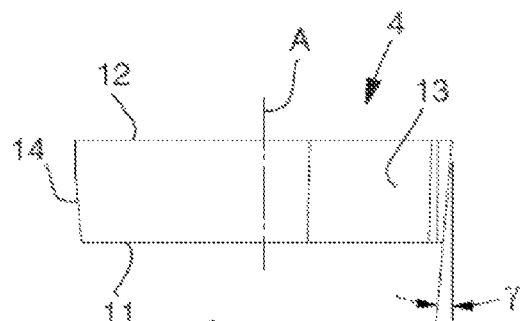
Figure 11E:
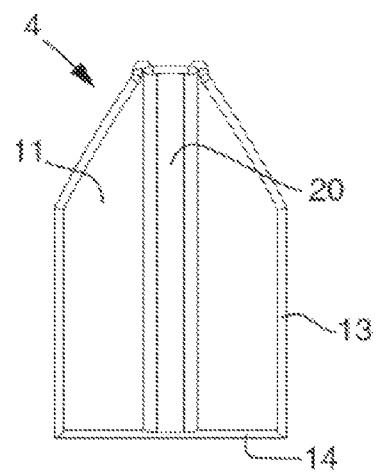
Figure 11F:
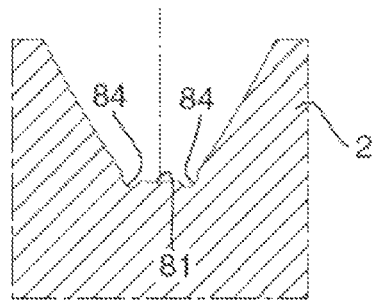
Figure 12A:
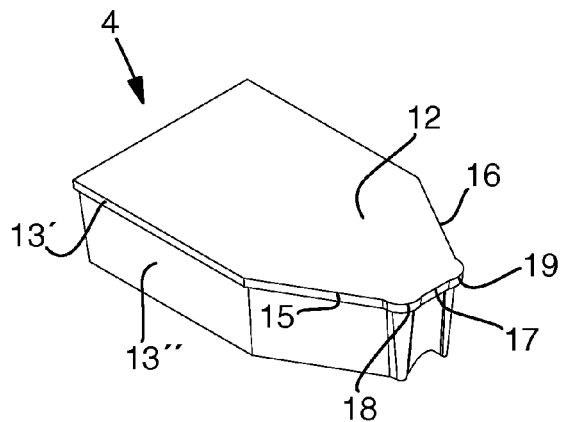
FIGS. 12A-12F are six different views corresponding to FIGS. 7A-7F but regarding a cutting insert according to a sixth embodiment of the invention.
Figure 12B:
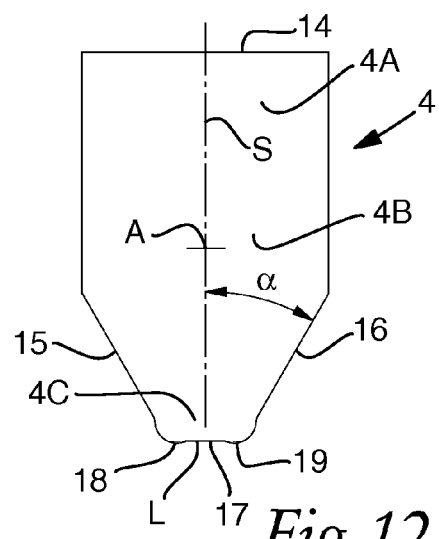
Figure 12C:
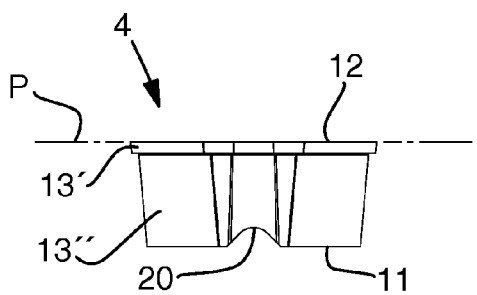
Figure 12D:
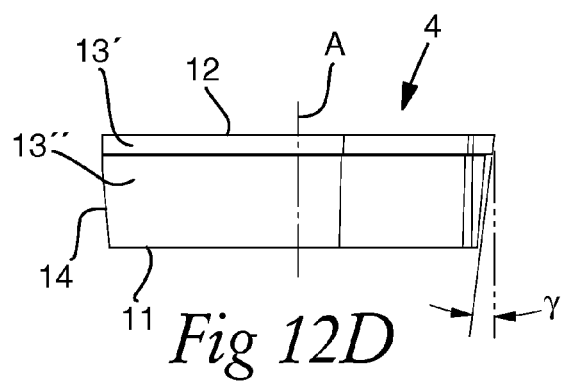
Figure 12E:
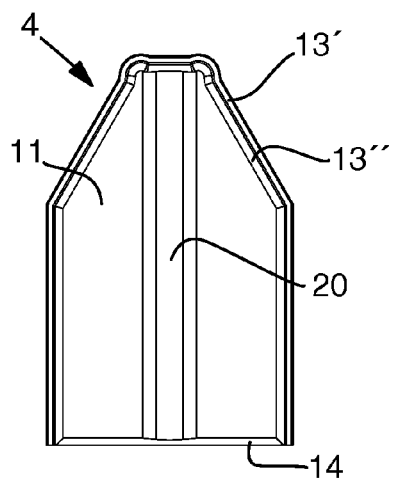
Figure 12F:
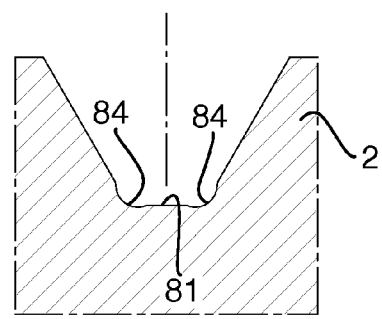
Figure 14A:
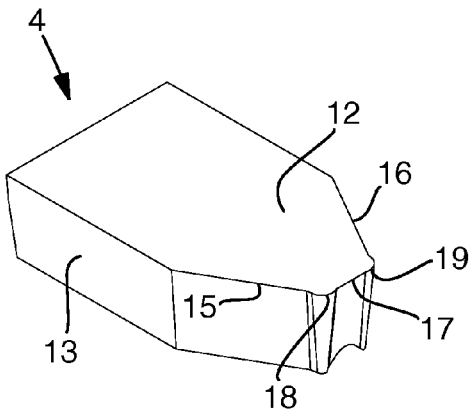
FIGS. 14A-14F are six different views corresponding to FIGS. 7A-7F but regarding a cutting insert according to an eighth embodiment of the invention.
Figure 14B:
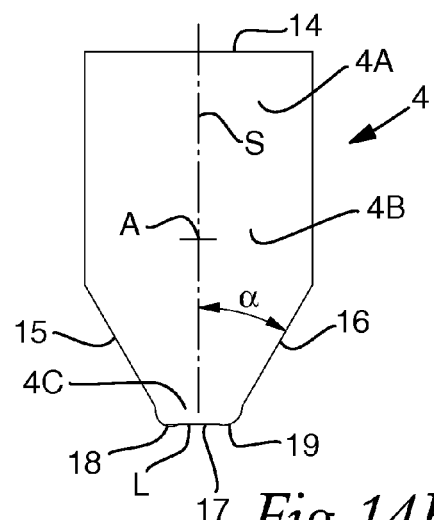
Figure 14C:
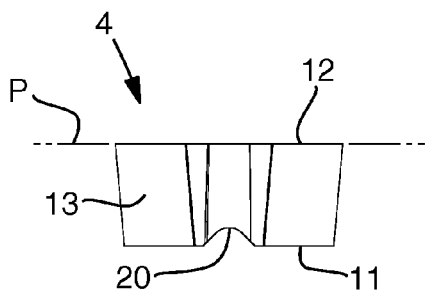
Figure 14D:
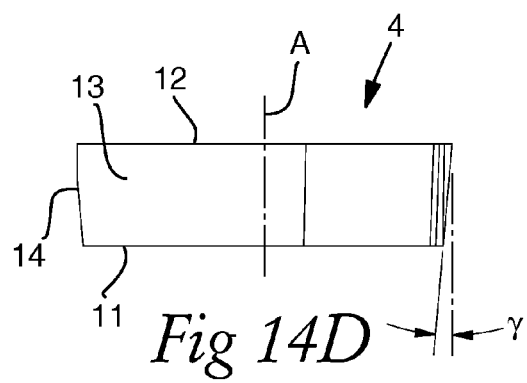
Figure 14E:
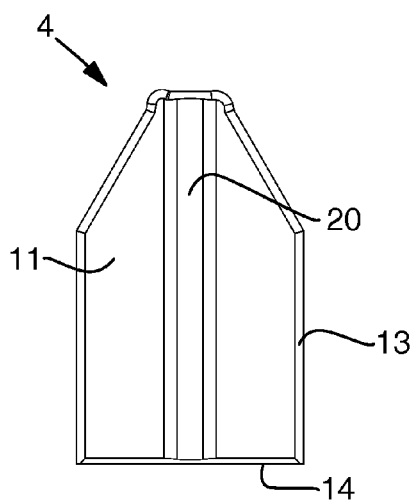
Figure 14F:
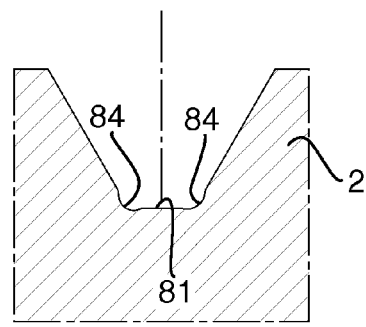
Figure 15A:
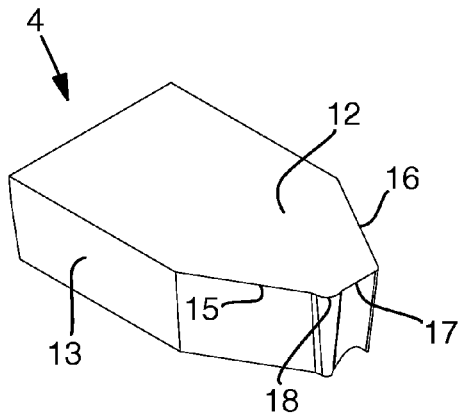
FIGS. 15A-15F are six different views corresponding to FIGS. 7A-7F but regarding a cutting insert according to a ninth embodiment of the invention.
Figure 15B:
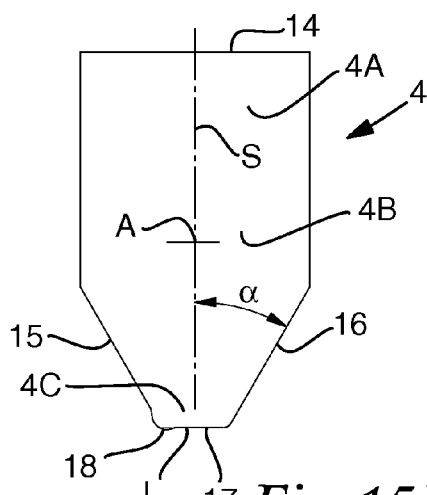
Figure 15C:
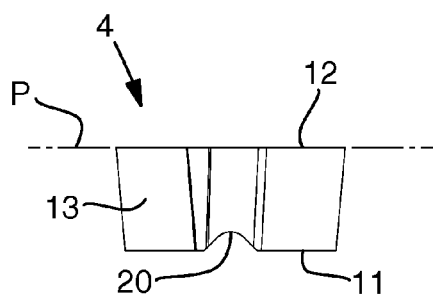
Figure 15D:
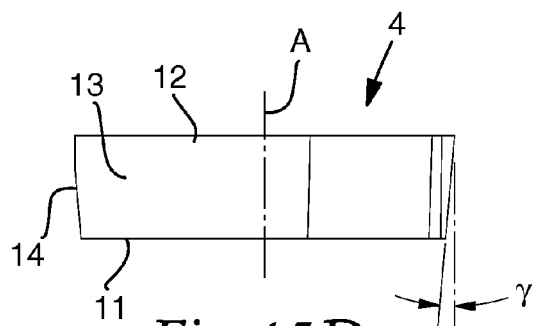
Figure 15E:
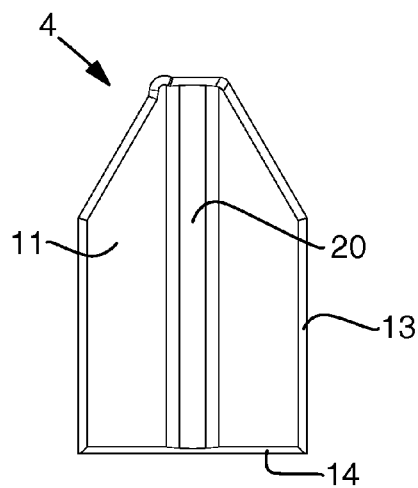
Figure 15F:
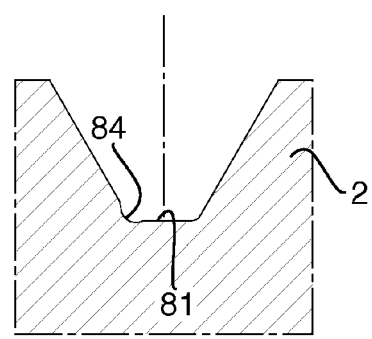

The primary corner cutting edge 18 extends, with respect to the rear portion 4A, forward from the front cutting edge 17 to a position that is on the other side of an imaginary line, which forms a primary extension L' of the edge line L and which extends further in a tangential direction from the end of the front cutting edge 17 to a primary point P' on the primary corner cutting edge 18, i.e., the primary extension L' is inside the primary corner cutting edge 18 on the upper side 12, as may be seen particularly in FIGS. 7G and 7H.

Also the secondary corner cutting edge 19 extends, with respect to the rear portion 4A, forward from the front cutting edge 17 to a position that is on the other side of an imaginary line, which forms a secondary extension L" of the edge line L and which extends further in a tangential direction from the end of the front cutting edge 17 to a secondary point P" on the secondary corner cutting edge 19, i.e., the secondary extension L" is inside the secondary corner cutting edge 19 on the upper side 12.

Furthermore, the primary corner cutting edge 18 extends with respect to the longitudinal axis S and the central portion 4B outwardly from the primary main cutting edge 15 to a position that is on the other side of an imaginary line, which forms an extension 15L of the primary main cutting edge 15 and which extends further in a tangential direction from the end of the primary main cutting edge 15 to a point 15P on the primary corner cutting edge, i.e., this extension 15L is inside the primary corner cutting edge 18 on the upper side 12.

Correspondingly, the secondary corner cutting edge 18 extends with respect to the longitudinal axis S and the central portion 4B outward from the secondary main cutting edge 16 to a position that is on the other side of an imaginary line, which forms an extension 16L of the secondary main cutting edge 16 and which extends further in a tangential direction from the end of the secondary main cutting edge 16 to a point 16P on the secondary corner cutting edge, i.e., this extension 16L is inside the secondary corner cutting edge 19 on the upper side 12.

By means of such projecting convex corner cutting edges 18 and 19, undercuts 84 are guaranteed in the tooth slot to be milled.

In the first embodiment, the primary corner cutting edge 18 and the secondary corner cutting edge 19 have a radius that is constant from the front cutting edge 17 at least to the primary point P' and the secondary point P''', respectively, and advantageously past these points P' and P''', respectively.

The primary corner cutting edge 18 is connected with the primary main cutting edge 15 by means of a primary transition zone 15', which forms a part of the cutting edge and a curved or bent transition between the primary main cutting edge 15 and the primary corner cutting edge 18. The secondary corner cutting edge 19 is connected with the secondary main cutting edge 16 by means of a secondary transition zone 16', which forms a part of the cutting edge and a curved or bent transition between the secondary main cutting edge 16 and the secondary corner cutting edge 19. These transition zones 15' and 16' have a radius. Thus, a smooth transition is obtained between the primary corner cutting edge 18 and the primary main cutting edge 15, as well as between the secondary corner cutting edge 19 and the secondary main cutting edge 16.

The primary corner cutting edge 18 is connected with the front cutting edge 17 by means of a primary border zone 18', which forms a part of the cutting edge and a curved or bent transition between the primary corner cutting edge 18 and the front cutting edge 17. The secondary corner cutting edge 19 is connected with the front cutting edge 17 by means of a secondary border zone 19', which forms a part of the cutting edge and a curved or bent transition between the secondary corner cutting edge 19 and the front cutting edge 17. These border zones 18' and 19' have a radius. Thus, a smooth transition is obtained also between the primary corner cutting edge 18 and the front cutting edge 17 as well as between the secondary corner cutting edge 19 and the front cutting edge 17.

In the first embodiment, the front cutting edge 17 is concave. In such a manner, a convex bottom surface 81, which is surrounded by two undercuts 84, can be provided in the slot 82 between adjacent teeth 83, see FIGS. 7F and 18.

FIGS. 8A-8F show a second embodiment of a cutting insert 4, which differs from the cutting insert 4 according to the first embodiment in that the front cutting edge 17 is convex. In such a manner, a concave bottom surface 81, which is surrounded by two undercuts 84, can be provided in the slot 82 between two adjacent teeth 83, see FIGS. 8F and 18. The second embodiment illustrates also that the bottom surface 11 may be flat, i.e., lack the longitudinal groove 20 that is shown in the first embodiment. Thus, the cutting insert 4 according to the second embodiment is adapted to mounting in a seat 8 having a flat first support surface 24.

Figure 18:
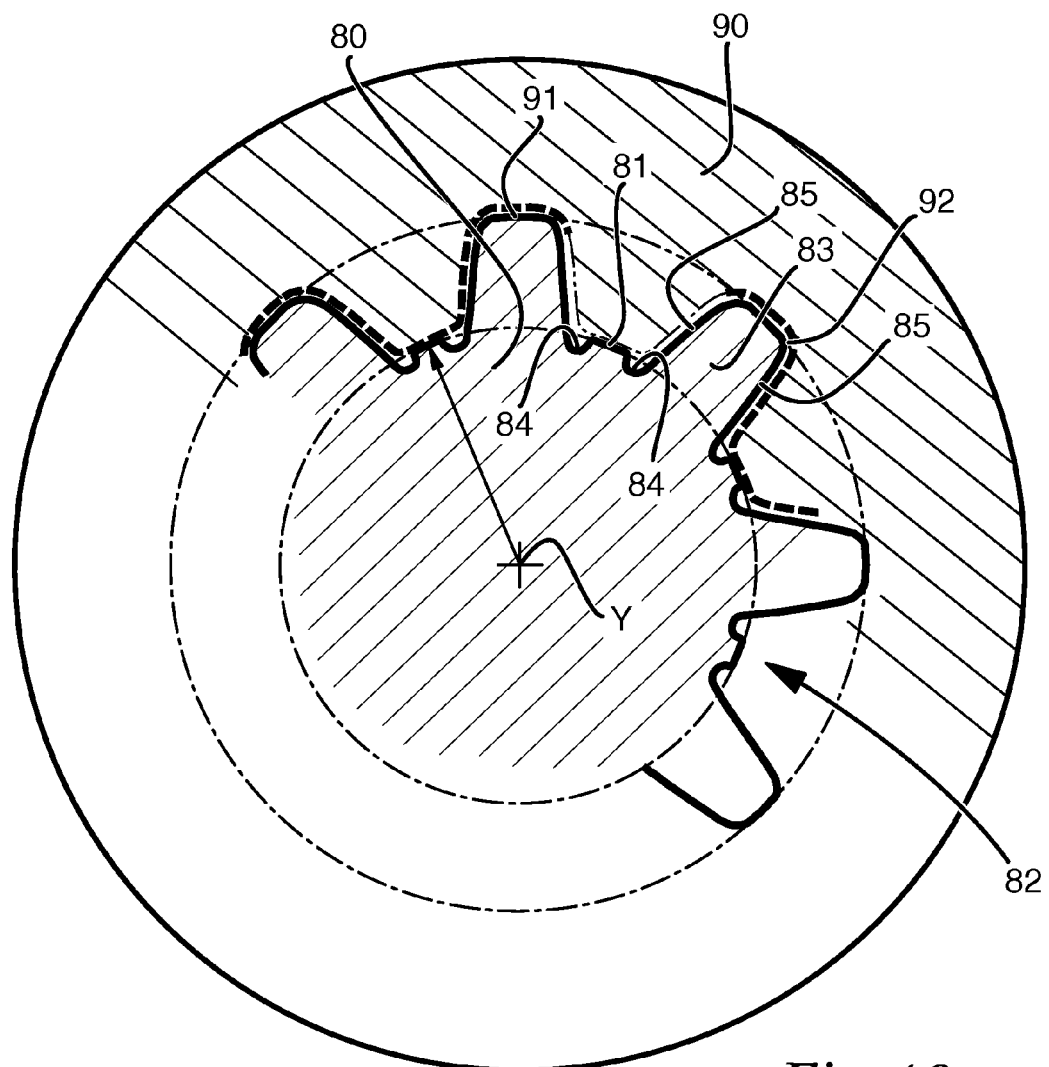
FIG. 18 is a cross-sectional view through a spline joint.

FIGS. 9A-9F show a third embodiment of a cutting insert 4, which differs from the cutting insert 4 according to the first embodiment in that the front cutting edge 17 is straight, see FIGS. 9F and 18. In such a manner, a straight bottom surface 81, which is surrounded by two undercuts 84, can be provided in the slot 82 between two adjacent teeth 83.

FIGS. 10A-10F show a fourth embodiment of a cutting insert 4, which differs from the cutting insert 4 according to the first embodiment in that the primary main cutting edge 15 and the secondary main cutting edge 16 are concave. These main cutting edges 15, 16 are suitable for providing tooth flanks that follow an involute curve.

FIGS. 11A-11F show a fifth embodiment of a cutting insert 4, which differs from the cutting insert 4 according to the first embodiment in that the primary main cutting edge 15 and the secondary main cutting edge 16 are convex. These main cutting edges 15, 16 are suitable for providing tooth flanks that follow a so-called inverted involute curve. In addition, the front cutting edge 17 of the cutting insert 4 according to the fifth embodiment is convex like the front cutting edge 17 in the second embodiment.

FIGS. 12A-12F show a sixth embodiment of a cutting insert 4, which differs from the cutting insert 4 according to the third embodiment in that the edge side 13 includes a first edge surface 13' and an elevated second edge surface 13", which borders on the cutting edge and is off-plane from the first edge surface 13'. Such an elevated second edge surface 13", referred to as a grinding shelf, simplifies the manufacture of the cutting insert 4 since only the second edge surface 13" needs to be ground in connection with the final finishing of the cutting insert 4.

FIGS. 13A-13F show a seventh embodiment of a cutting insert 4, which differs from the cutting insert 4 according to the sixth embodiment in that the upper side 12 includes an elevated peripheral chip surface 12', which borders on the cutting edge and a central chip surface 12", which is situated inside the peripheral chip surface 12' and is off-plane from the peripheral chip surface 12'. More precisely, the central chip surface 12" is on a lower level than the peripheral chip surface 12'. Such a peripheral chip surface 12', i.e., a grinding shelf, also simplifies the manufacture of the cutting insert 4. In the finishing and the final grinding of the cutting insert 4, not as much material has to be machined away, but only a layer of the peripheral chip surface 12'.

FIGS. 14A-14F show an eighth embodiment of a cutting insert 4, which differs from the cutting insert 4 according to the third embodiment in that the secondary corner cutting edge 19 does not extend outwardly from and past an extension of the edge line L. In other words, the secondary corner cutting edge 19 borders on the front cutting edge 17 in such a way that a tangent of the secondary corner cutting edge 19 and a tangent of the front cutting edge 17 are parallel and coincide with each other at the secondary border point 19'. However, the secondary corner cutting edge 19 extends outwardly and past the secondary main cutting edge 16 and borders on the secondary main cutting edge 16 in such a way that a tangent of the secondary corner cutting edge 19 and a tangent of the secondary main cutting edge 16 are parallel and coincide with each other at the secondary transition point 16'. It should be noted that this modification of the secondary corner cutting edge 19 instead may be made with respect to the primary main cutting edge 18.

FIGS. 15A-15F show a ninth embodiment of a cutting insert 4, which differs from the cutting insert 4 according to the eighth embodiment in that neither the secondary corner cutting edge 19 extends outwardly and past the secondary main cutting edge 16. In other words, it may be said that the secondary corner cutting edge 19 is lacking and that the front cutting edge 17 borders on and transforms into the secondary main cutting edge 16. It should be noted that this modification of the secondary corner cutting edge 19 instead may be made with respect to the primary main cutting edge 18.

Figure 16:
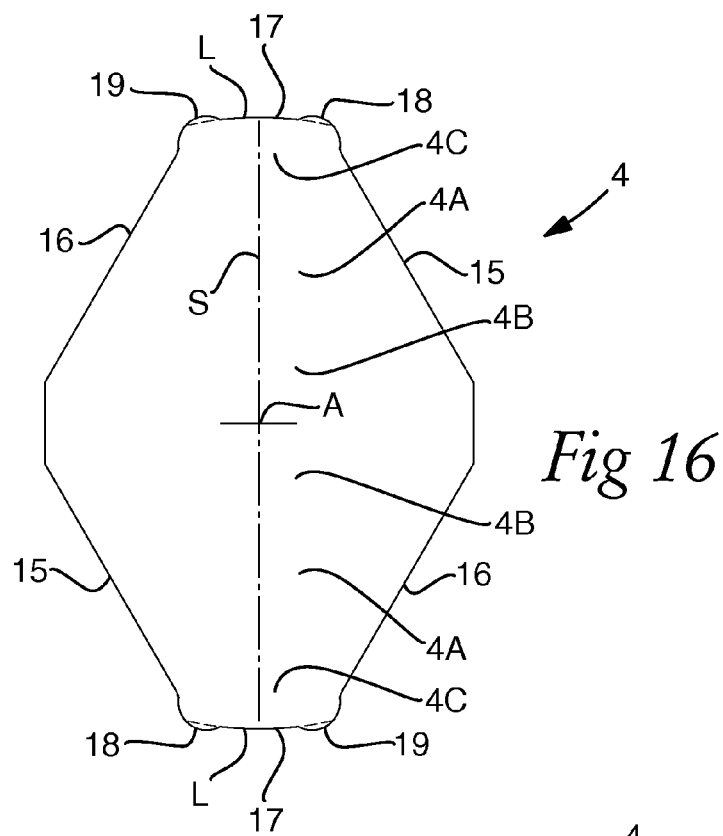
FIG. 16 shows a view from above of a variant of the cutting insert according to the first embodiment.

FIG. 16 shows a variant of the second embodiment and differs from the cutting insert 4 according to this in that the cutting insert 4 has been formed as an indexable cutting insert 4, which can be rotated 180° on the through axis A and which has two sets of cutting edges. It should be noted that this indexability may be made for the cutting inserts 4 according to all embodiments. In the indexable cutting insert 4, the rear portion 4A is formed of a central area, which constitutes the rear portion 4A of the two cutting edges.

The indexable cutting insert 4 also includes a central fastening hole 28 for the attachment of the cutting insert 4 by means of a fixing screw (not shown), which extends through the fastening hole 28 and into a threaded hole in the first support surface 24 of the seat in the tool body 3. This alternative attachment is also applicable to the cutting inserts 4 according to the other embodiments.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A cutting insert for a milling tool for the milling of a slot in a workpiece, the cutting insert comprising:
    an under side;
    an opposite upper side, which forms a chip surface and extends parallel to an extension plane;
    an edge side disposed between the upper side and the underside;
    a through axis extending through the underside and the upper side perpendicular to an extension plane;
    a longitudinal axis, which is perpendicular to and intersects the through axis and which extends through a rear portion of the cutting insert, and
    a cutting edge extending between the edge side and the chip surface, the cutting edge including a primary main cutting edge arranged to be in engagement with the workpiece during milling, a front cutting edge, which is arranged to be in engagement with the workpiece during milling, the front cutting edge extending along an edge line, a normal to the extension plane forming an acute clearance angle with the edge side along the cutting edge, and a primary corner cutting edge arranged to be in engagement with the workpiece during milling and situated between the primary main cutting edge and the front cutting edge, the primary corner cutting edge having a convex shape, and extending, with respect to the rear portion, forward from the front cutting edge to a position that is on the other side of an imaginary line, which forms a primary extension of the edge line and which extends further in a tangential direction from an end of the front cutting edge to a primary point on the primary corner cutting edge.

2. A cutting insert according to claim 1, wherein the primary corner cutting edge has a radius that is constant from the front cutting edge to at least the primary point.

3. A cutting insert according to claim 1, wherein the primary corner cutting edge with respect to the longitudinal axis and a central portion of the cutting insert, extends outwardly from the primary main cutting edge to a position that is on the other side of an imaginary line, which forms an extension of the primary main cutting edge and which extends further in a tangential direction from the end of the primary main cutting edge to a point on the primary corner cutting edge.

4. A cutting insert according to claim 1, wherein the primary corner cutting edge is connected with the primary main cutting edge by a primary transition zone, which forms a curved transition between the primary corner cutting edge and the primary main cutting edge.

5. A cutting insert according to claim 1, wherein the primary corner cutting edge is connected with the front cutting edge by a primary border zone, which forms a curved transition between the primary corner cutting edge and the front cutting edge.

6. A cutting insert according to claim 1, wherein the cutting edge comprises a secondary main cutting edge arranged to engage the workpiece during milling, and a secondary corner cutting edge arranged to engage the workpiece during milling and extending between and connecting the secondary main cutting edge and the front cutting edge, and wherein the secondary corner cutting edge has a convex shape and, with respect to the rear portion, extends forward from the front cutting edge to a position that is on the other side of an imaginary line, which forms a secondary extension of the edge line and which extends further in a tangential direction from an end of the front cutting edge to a secondary point on the secondary corner cutting edge.

7. A cutting insert according to claim 6, wherein the secondary corner cutting edge is connected with the secondary main cutting edge at a secondary transition zone, which forms a curved transition between the secondary corner cutting edge and the secondary main cutting edge.

8. A cutting insert according to claim 6, wherein the secondary corner cutting edge is connected with the front cutting edge at a secondary border zone, which forms a curved transition between the secondary corner cutting edge and the front cutting edge.

9. A cutting insert according to claim 6, wherein the secondary corner cutting edge, with respect to the longitudinal axis and a central portion of the cutting insert, extends outwardly from the secondary main cutting edge to a position that is on the other side of an imaginary line, which forms an extension of the secondary main cutting edge and which extends further in a tangential direction from the end of the secondary main cutting edge to a point on the secondary corner cutting edge.

10. A cutting insert according to claim 6, wherein the primary main cutting edge and the secondary main cutting edge converge toward each other up to the primary corner cutting edge and the secondary corner cutting edge, respectively.

11. A cutting insert according to claim 10, wherein the longitudinal axis forms an angle of convergence with each one of the primary main cutting edge and the secondary main cutting edge, and wherein the angle of convergence lies in the interval of 15-45°.

12. A cutting insert according to claim 6, wherein the primary main cutting edge (15) and the secondary main cutting edge (16) are symmetrical in respect of the longitudinal axis (S).

13. A cutting insert according to claim 6, wherein each one of the primary main cutting edge and the secondary main cutting edge is longer than the front cutting edge.

14. A cutting insert according to claim 1, wherein the front cutting edge is concave.

15. A cutting insert according to claim 1, wherein the front cutting edge is convex.

16. A cutting insert according to claim 1, wherein the front cutting edge is straight.

17. A cutting insert according to claim 1, wherein the edge side has a thickness parallel to the through axis and the upper side has an extension perpendicular to the longitudinal axis and the through axis, which extension is longer than the thickness.

18. A cutting insert according to claim 1, further comprising a longitudinal groove in the underside, which extends parallel to the longitudinal axis.

19. A milling tool for milling of a slot in a workpiece, wherein the milling tool is arranged to rotate on a rotation axis, the milling tool comprising:
a tool body; and
a plurality of cutting inserts mounted on the tool body, each of the plurality of cutting inserts including
an under side,
an opposite upper side, which forms a chip surface and extends parallel to an extension plane,
an edge side disposed between the upper side and the underside,
a through axis extending through the underside and the upper side perpendicular to the extension plane,
a longitudinal axis, which is perpendicular to and intersects the through axis and which extends through a rear portion of the cutting insert, and
a cutting edge extending between the edge side and the chip surface, the cutting edge including a primary main cutting edge arranged to be in engagement with the workpiece during milling, a front cutting edge arranged to be in engagement with the workpiece during milling, the front cutting edge extending along an edge line, a normal to the extension plane forming an acute clearance angle with the edge side along the cutting edge, and a primary corner cutting edge arranged to be in engagement with the workpiece during milling and situated between the primary main cutting edge and the front cutting edge, the primary corner cutting edge having convex shape, and extending, with respect to the rear portion, forward from the front cutting edge to a position that is on the other side of an imaginary line, which forms a primary extension of the edge line and which extends further in a tangential direction from an end of the front cutting edge to a primary point on the primary corner cutting edge.

20. A milling tool according to claim 19, wherein the longitudinal axis of each of the plurality of cutting inserts intersects the rotation axis.

21. A milling tool according to claim 19, wherein the tool body includes a seat for receiving a respective cutting insert, and wherein the seat has a first support surface, which extends along a support plane parallel to the rotation axis.

22. A milling tool according to claim 21, wherein the support surface comprises a ridge, which interacts with a longitudinal groove in the underside of the cutting insert.

* * * * *